(12) United States Patent
Ham

(10) Patent No.: US 6,925,194 B2
(45) Date of Patent: Aug. 2, 2005

(54) CURVED LANE RECOGNIZING METHOD IN ROAD MODELING SYSTEM

(75) Inventor: Chul-Bae Ham, Seoul (KR)

(73) Assignee: Hyundai Motor Company, Seoul (KR)

( * ) Notice: Subject to any disclaimer, the term of this patent is extended or adjusted under 35 U.S.C. 154(b) by 670 days.

(21) Appl. No.: 10/003,431

(22) Filed: Dec. 6, 2001

(65) Prior Publication Data

US 2002/0081000 A1 Jun. 27, 2002

(30) Foreign Application Priority Data

Dec. 27, 2000 (KR) .......................................... 2000-82959

(51) Int. Cl.$^7$ ................................................ G06K 9/00
(52) U.S. Cl. ........................ 382/106; 356/3.1; 356/602; 701/205; 342/126
(58) Field of Search ............................ 356/3, 3.01, 3.1, 356/602, 623, 631; 382/100, 106; 342/126, 450; 340/933; 701/205, 209–211

(56) References Cited

U.S. PATENT DOCUMENTS

| | | | | |
|---|---|---|---|---|
| 5,757,949 A | * | 5/1998 | Kinoshita et al. | 382/104 |
| 6,138,084 A | * | 10/2000 | Mine | 702/157 |
| 6,493,458 B2 | * | 12/2002 | Yasui et al. | 382/104 |
| 6,813,370 B1 | * | 11/2004 | Arai | 382/104 |

FOREIGN PATENT DOCUMENTS

| | | |
|---|---|---|
| DE | 100 43 467 A1 | 4/2001 |
| JP | 61-208585 | 9/1986 |
| JP | 73-314616 | 12/1988 |
| JP | 02-090379 | 3/1990 |
| JP | 05-151341 | 6/1993 |
| JP | 07-128059 | 5/1995 |
| JP | 10-047923 | 2/1998 |

OTHER PUBLICATIONS

Jin–Chuan Hsu et al, Estimations of Previewed Road Curvatures and Vehicular Motion by a Vision–Based Data Fusion Scheme, appearing in Machine Visions and Applications 9: 179–192 (1997).

* cited by examiner

Primary Examiner—Samir Ahmed
Assistant Examiner—Anand Bhatnagar
(74) Attorney, Agent, or Firm—Antonelli, Terry, Stout & Kraus, LLP

(57) ABSTRACT

The present invention provides a method for recognizing a curved lane, the method comprising: dividing an image processing range into an upper range and a lower range if photographs of lane images are supplied; and modeling straight lines in the two divided image processing ranges respectively, and obtaining a curvature of the lane using the modeled straight lines.

2 Claims, 3 Drawing Sheets

CURVED LANE RECOGNIZING METHOD IN ROAD MODELING SYSTEM

CROSS-REFERENCE TO RELATED APPLICATION

This application claims priority of Korea patent Application No. 10-20005-0082959, filed on Dec. 27, 2000.

BACKGROUND OF THE INVENTION (a) Field of the Invention

The present invention relates to a road modeling method, and more particularly, to a method for recognizing a curved lane on which a vehicle is traveling by dividing an image of the lane into two parts and modeling a curved lane.

(b) Description of the Related Art

Generally, in an automated highway system, after recognizing a lane, a vehicle provides information for steering to a driver or automatically steers according to the recognized lane.

A curved lane is modeled through a predetermined modeling method using an image of a lane photographed by a digital camera. In recognizing a lane, it is important to recognize a curved lane.

FIG. 1 shows a method for recognizing a curved lane in a road modeling method.

A conventional road modeling method, with reference to FIG. 1, includes the steps of extracting lane edge components of road lane markers and modeling a straight lane or a curved lane using the acquired lane edge components.

A CCD (Charged-Coupled Device) camera continuously photographs images of the lane markers and provides the collected images to a road modeling processor. Then, the processor extracts the lane edge components from the images of the lane markers.

If the lane edge components are extracted, road modeling is performed by a given modeling method. There are two typical modeling methods, one of which is a method to model a straight lane and the other being a method to model a curved lane.

FIG. 2 shows an example of modeling a straight lane on a curved lane.

A straight lane delineated by the lines "b" is modeled from a lane component of lines "a" acquired by extracting the lane edge components from the photographed images.

However, if a curved lane is recognized as a straight lane, some problems occur. For example, if this method is used in a system for preventing a vehicle from deviating from a lane or a system for sounding an alarm when the vehicle deviates from the lane, it may cause a malfunction or mis-alarming.

On the other hand, if a curved lane is modeled on a curved road, the curved road is recognized as it is but real time processing is difficult because of too many calculations.

SUMMARY OF THE INVENTION

The present invention has been made in an effort to solve the above problems. It is an object of the present invention to provide a method for recognizing a curved lane by dividing a road image into two ranges and modeling a straight line at each range.

To achieve the above object, a method for recognizing a curved lane according to the present invention comprises:

dividing an image processing range into two parts if photographs of lane images are supplied;

modeling straight lines on the lane in each image processing range; and obtaining a curvature of the lane using the modeled straight lines.

DETAILED DESCRIPTION OF THE PREFERRED EMBODIMENTS

Hereinafter, a preferred embodiment of the present invention will be described in detail with reference to the accompanying drawings.

In the present invention, an image processor is preferably realized by a processor such as a CPU (Central Processing Unit), photographs are realized by a CCD camera that can acquire real time digital images, and an image processing range is divided into two parts.

Figure 1:
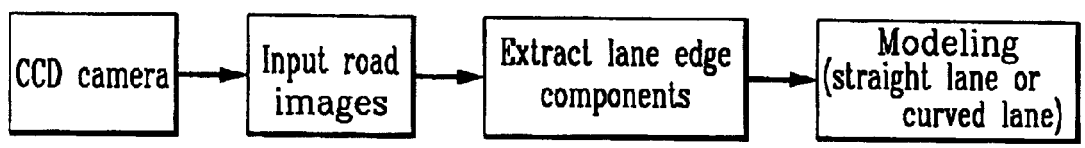
FIG. 1 shows a method for recognizing a curved lane in modeling a road.
Figure 2:
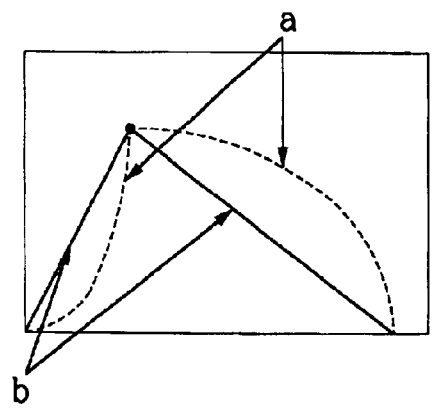
FIG. 2 shows an example of modeling a straight lane on a curved lane.
Figure 3:
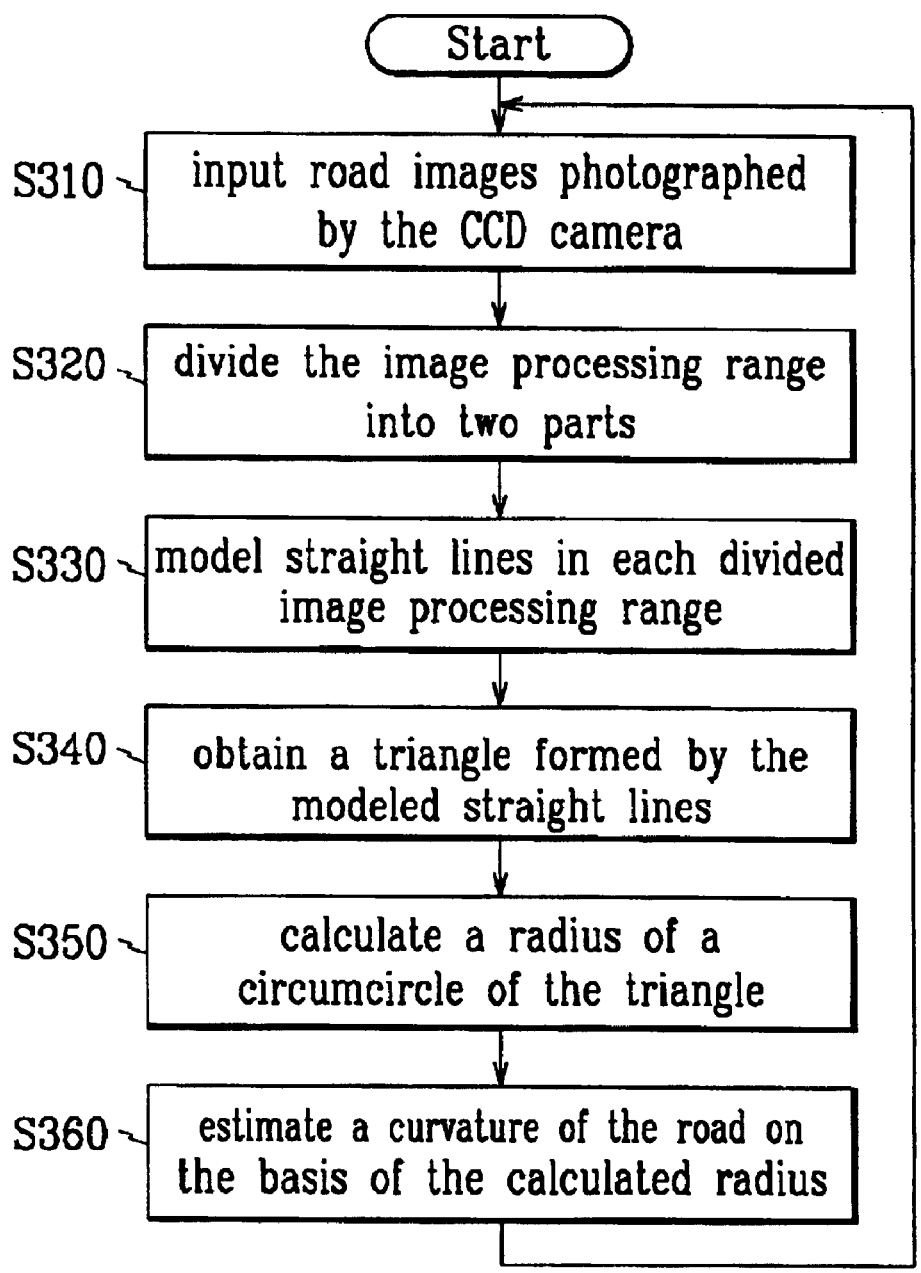
FIG. 3 is a flowchart of a method for recognizing a curved lane according to the present invention.
Figure 4:
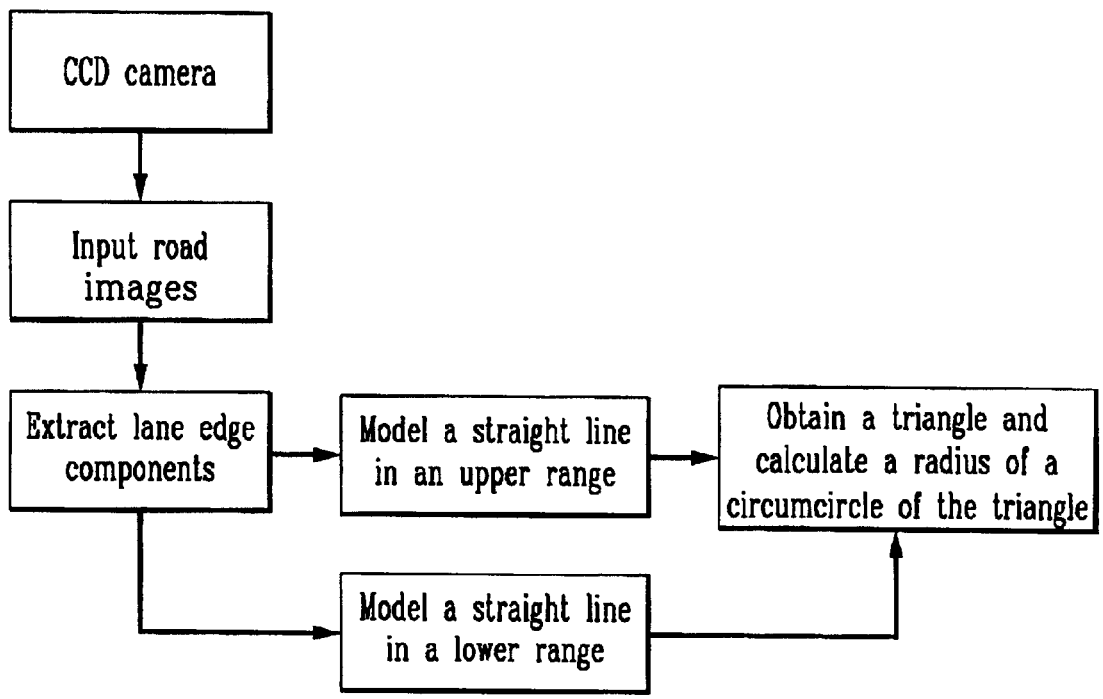
FIG. 4 is a block diagram of the method for recognizing a curved lane according to the present invention.

As shown in FIGS. 3 and 4, the CCD camera photographs road images, and the photographed images are supplied to a road modeling system (S310). An interface for supplying the images is generally known, and the present invention is not restricted to a certain interfacing type.

Figure 5:
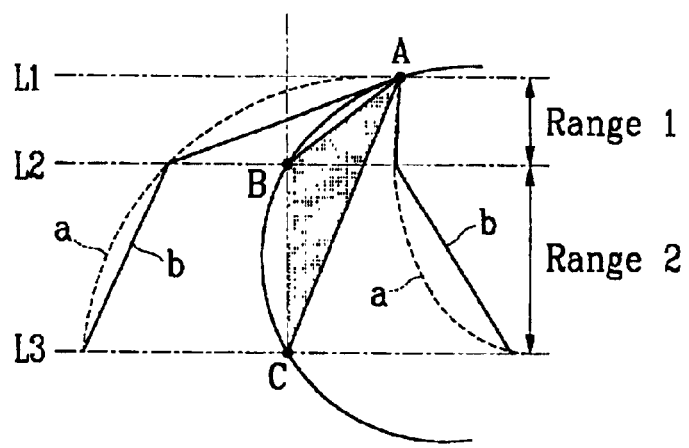
FIG. 5 is an illustrative drawing of the method for recognizing a curved lane according to the present invention.

If the images photographed by the CCD camera are supplied to the processor, the processor divides the image processing range into two parts (S320). The image processing range can be preferably divided into an upper range and a lower range by a line L2 dividing the two ranges, as shown in FIG. 5.

Hereinafter, a range between lines L1 and L2 is called range 1, and a range between lines L2 and L3 is called range 2. A disappearing point A of the road images is located on the line L1.

The processor models straight lines in each range, respectively (S330).

In step S330, straight lanes are modeled in each image processing range by extracting lane edge components "a" from the two ranges and connecting the points where the lane edge components intersect the lines L1, L2, and L3. Therefore, straight lines "b" are acquired.

Then, as shown in FIG. 5, a triangle is acquired, the triangle having three vertices A, B and C. Preferably, point A is the image disappearing point, point B is a point centered between two points at which the line L2 intersects the straight lines "b" respectively, and the point C is a point centered between two points at which the line L3 intersects the straight lines "b" respectively. Here, if the road crests a hill, there is no disappearing point. In this case, a point centered between the points where the lane images intersect the line L1 is considered as the disappearing point A.

After acquiring the triangle ABC, a radius R (not shown) of a circumcircle of the triangle is calculated (S350). The radius of the circumcircle can be uniquely determined.

The radius R of the circumcircle of the triangle can be calculated by the following equation.

$$R = \mathrm{Len}(AB) * \mathrm{Len}(BC) * \mathrm{Len}(AC)/4S \qquad (1)$$

wherein "AB", "BC" and "AC" are respectively the three sides of the triangle, Len(x) denotes a length of a segment "x", and "S" denotes the area of the triangle ABC.

If the radius of the circumcircle of the triangle is acquired in step S350, the processor recognizes a curvature of a road on which the vehicle is running on the basis of the radius (S360).

By recognizing a curved road using the above method, the recognized road becomes analogous to the real curved road.

In another embodiment of the present invention, the curved road can be recognized by using an angle formed by the two lines AB and BC. Using the angle, it can be determined whether the road is straight or curved, and using the magnitude of the angle, a steering angle can be determined.

Therefore, the above method can be used in the Automated Highway System, and the recognized lane curvature can be provided to a driver.

Compared with a method for modeling a straight line on a curved road, the above method can increase the preciseness in recognizing a curved road. Also, compared with a method for modeling a curved line on a curved road, the above method can decrease the amount of calculation of the processor.

Moreover, an angle between a center line of the lane and a direction of the vehicle movement can be obtained, and the obtained angle can be used in determining a steering angle.

While the present invention has been described in detail with reference to the preferred embodiment, those skilled in the art will appreciate that various modifications and substitutions can be made thereto without departing from the spirit and scope of the present invention as set forth in the appended claims.

What is claimed is:

1. A method for recognizing a curved lane in a road modeling system, the method comprising:

(a) dividing an image processing range into an upper range and a lower range if photographs of lane images are supplied;

(b) modeling straight lines in the two divided image processing ranges respectively, and obtaining a curvature of the lane using the modeled straight lines by:

(i) modeling straight lines in the two ranges respectively;

(ii) obtaining a triangle, two sides of which are two modeled lines; and (iii) calculating a radius of a circumcircle of the triangle and estimating therewith a curvature of the lane; and wherein the straight line of the upper range is obtained by connecting a road image disappearing point and a point centered between two points at which lane edges intersect a line dividing the image processing range and the straight line of the lower range is obtained by connecting the point centered between the two points at which the lane edges intersect the line dividing the image processing range and a point centered between two points at which lane edges intersect a bottom line of the lower range, and the triangle is obtained by connecting the road image disappearing point and the two centered points.

2. The method of claim 1 wherein the curvature of the lane is estimated by an angle between the two modeled straight lines.

* * * * *